(12) United States Patent
Corghi

(10) Patent No.: US 6,805,004 B2
(45) Date of Patent: Oct. 19, 2004

(54) BALANCING MACHINE FOR ROTATING BODIES, IN PARTICULAR FOR MOTOR VEHICLE WHEELS

(75) Inventor: Remo Corghi, Correggio (IT)

(73) Assignee: Corghi S.p.A., Correggio (IT)

( * ) Notice: Subject to any disclaimer, the term of this patent is extended or adjusted under 35 U.S.C. 154(b) by 0 days.

(21) Appl. No.: 10/632,918

(22) Filed: Aug. 4, 2003

(65) Prior Publication Data

US 2004/0050159 A1 Mar. 18, 2004

(30) Foreign Application Priority Data

Sep. 16, 2002 (IT) .................................. RE2002A000069

(51) Int. Cl.⁷ ............................. G01M 1/02; G01M 1/16
(52) U.S. Cl. .............................. 73/462; 73/487; 348/95; 700/279
(58) Field of Search ........................... 73/66, 460, 462, 73/487; 348/94, 95; 700/279; 301/5.21, 5.22

(56) References Cited

U.S. PATENT DOCUMENTS

| | | | | |
|---|---|---|---|---|
| 4,109,532 A | * | 8/1978 | Donato | 73/457 |
| 5,909,097 A | * | 6/1999 | Rothamel et al. | 318/561 |
| 6,122,957 A | * | 9/2000 | Bux et al. | 73/66 |
| 6,244,108 B1 | | 6/2001 | McInnes et al. | |

* cited by examiner

Primary Examiner—Helen Kwok
Assistant Examiner—John C Hanley
(74) Attorney, Agent, or Firm—Browdy and Neimark, P.L.L.C.

(57) ABSTRACT

The machine determines, by first measurement sensor means (30), the axial position of at least one transverse balancing plane (P1, P2) in which the operator chooses to apply a respective balancing mass, and the radial position of points on the application surface (11a) corresponding with said balancing plane (P1, P2), while the machine monitors the angular position of the body (10); the body (10) is rotated and by suitable means the machine determines the imbalance means together with the data originating from the first and second sensor means, the value of each balancing mass and the position of its point of application on the application surface (11a) being determined. According to the invention, images originating from the application surface (11a) on the body (10) are acquired by an image acquisition means, said images being displayed on a screen (61) accessible to the operator, on the screen there also being indicated the position of application of the balancing mass in relation to the image of the application surface (11a) which appears on it, for application of the balancing masses the body (10) being brought into an angular position such that the point of application of the masses falls within any region of the field visible on the screen (61).

3 Claims, 3 Drawing Sheets

BALANCING MACHINE FOR ROTATING BODIES, IN PARTICULAR FOR MOTOR VEHICLE WHEELS

FIELD OF THE INVENTION

This invention relates to a balancing machine for compensating imbalance factors in rotating bodies having a surface of rotation about an axis, said factors being compensated by applying one or more balancing masses. Typically the machine of the invention is provided for balancing motor vehicle wheels, in which the balancing masses are applied to the wheel rim; however it can also be applied to other rotating bodies, such as flywheels.

BACKGROUND OF THE INVENTION

Balancing machines, in particular for motor vehicle wheels, have been known for some time possessing a support and rotation shaft (i.e. a main shaft) on which the wheel is fixed with its axis of rotation coaxial to the axis of the shaft, which rotates the wheel.

On these machines, first sensor means having for example a movable sensor arm firstly determine the axial position of at least one transverse balancing plane (usually two planes), i.e. a plane perpendicular to the axis of rotation, passing through the region chosen by the operator on which to apply a respective balancing mass, said choice deriving from considerations of various kinds, for example to make the balancing mass invisible from the outside, or because the surface of the body in that plane is particularly suitable for application of the balancing mass. In addition to the axial position of the plane, the radial coordinate of the wheel rim surface in correspondence with said balancing plane is also determined. At the same time, using second sensor means comprising for example an encoder able to monitor the angular position of the main shaft, every angular position of the body relative to a reference position can be determined.

The main shaft of the machine is then rotated, and the imbalance factors are determined by long known methods using suitable sensing means. The data originating from the first and second sensor means and the data relative to the imbalance are then processed by a processor means, and the value of the balancing masses and the position of their point of application to the wheel rim in the chosen balancing plane are then determined.

The balancing masses, of the calculated value, are then applied in the calculated positions. This operation is carried out in various ways depending on the type of weights used and the balancing program. Given the increasing use of aluminium alloy wheel rims, there is an increased need to apply balancing masses by adhesive to the inside of the body rim. To ensure maximum balancing precision, the balancing mass must be positioned with extreme accuracy in the respective balancing plane and in the calculated angular position therein.

For this purpose various systems have been developed which provide for assisted application of the balancing masses.

The most improved of these systems, illustrated in U.S. Pat. No. 6,244,108, comprises the use of an oscillating indicator means connected to the processor means to project a light point onto the application surface of the wheel rim in the position of application of the balancing mass calculated by the processor. This indicator means determines the position of the application point with the aid of means which halt the shaft rotation in the calculated angular position.

This system facilitates the application of the balancing masses and makes it more precise.

However the automatic search for the point of application of the balancing mass requires complex and costly means for controlling the oscillation of the light-emitting indicator means and rigorous control of the action of the brake and motor to halt the shaft in the exact angular position, so increasing the machine cost and complexity.

SUMMARY OF THE INVENTION

An object of the invention is to improve the machines of the initially described type, in particular of the aforesaid type, such as to eliminate the described defects.

This and further objects are attained by the invention as characterised in the claims.

The invention is based on the fact of comprising a means arranged to acquire images from that surface of the body on which the balancing masses are to be applied (i.e. the inner surface of the wheel rim including its end edges, in the case of a motor vehicle wheel) and a display means connected to the processor means (arranged to calculate the value of the balancing mass and the position of its point of application on the application surface of the body in correspondence with the balancing plane), which displays said images on a screen accessible to the operator, the processor means indicating on the screen the position of the point of application of the balancing mass in relation to those images originating from the application surface which appear on it. Specifically, to indicate the point of application of the balancing mass, the processor means displays an optical pointer which appears on the screen at said point of application, superposed on the acquired image of the application surface (inner surface of the wheel rim).

Preferably, to automatically halt the rotation of the wheel support and rotation means, a means is provided connected to the second sensor means and arranged to halt the wheel in an angular position such that the point of application of the balancing mass falls within any region of the field visible on the screen.

In use, in accordance with the known art, first measurement sensor means firstly determine the axial position of at least one transverse balancing plane in which the operator chooses to apply a respective balancing mass, and the radial position of points on the application surface of the body corresponding with said balancing plane, while by second sensor means the machine monitors the angular position of the wheel; the wheel is rotated and by suitable means the machine determines the imbalance factors thereon, these being processed by a processor means together with the data originating from the first and second sensor means, the value of each balancing mass and the position of its point of application on the application surface (inner surface of the wheel rim) being determined. According to the invention, images originating from the body are acquired by the image acquisition means, said images being displayed on the screen accessible to the operator; to apply the balancing masses the body is brought into an angular position such that the point of application of the masses falls within any region of the field visible on the screen, on the screen there being indicated the position of application of the balancing mass in relation to the image which appears on it.

By virtue of the invention, the weight application is quick and precise, and in addition the complex and costly control system for the light point provided in the prior art is eliminated.

Precise control during the braking of the body is not required because the optical position pointer moves over the screen on the basis of the angular position in which the body is halted.

Finally, the invention can also be used for applying spring weights to the edge of the body.

BREIF DESCRIPTION OF THE DRAWINGS

The invention is described in detail hereinafter with the aid of the accompanying figures which illustrate one embodiment thereof by way of non-exclusive example.

Figure 1:
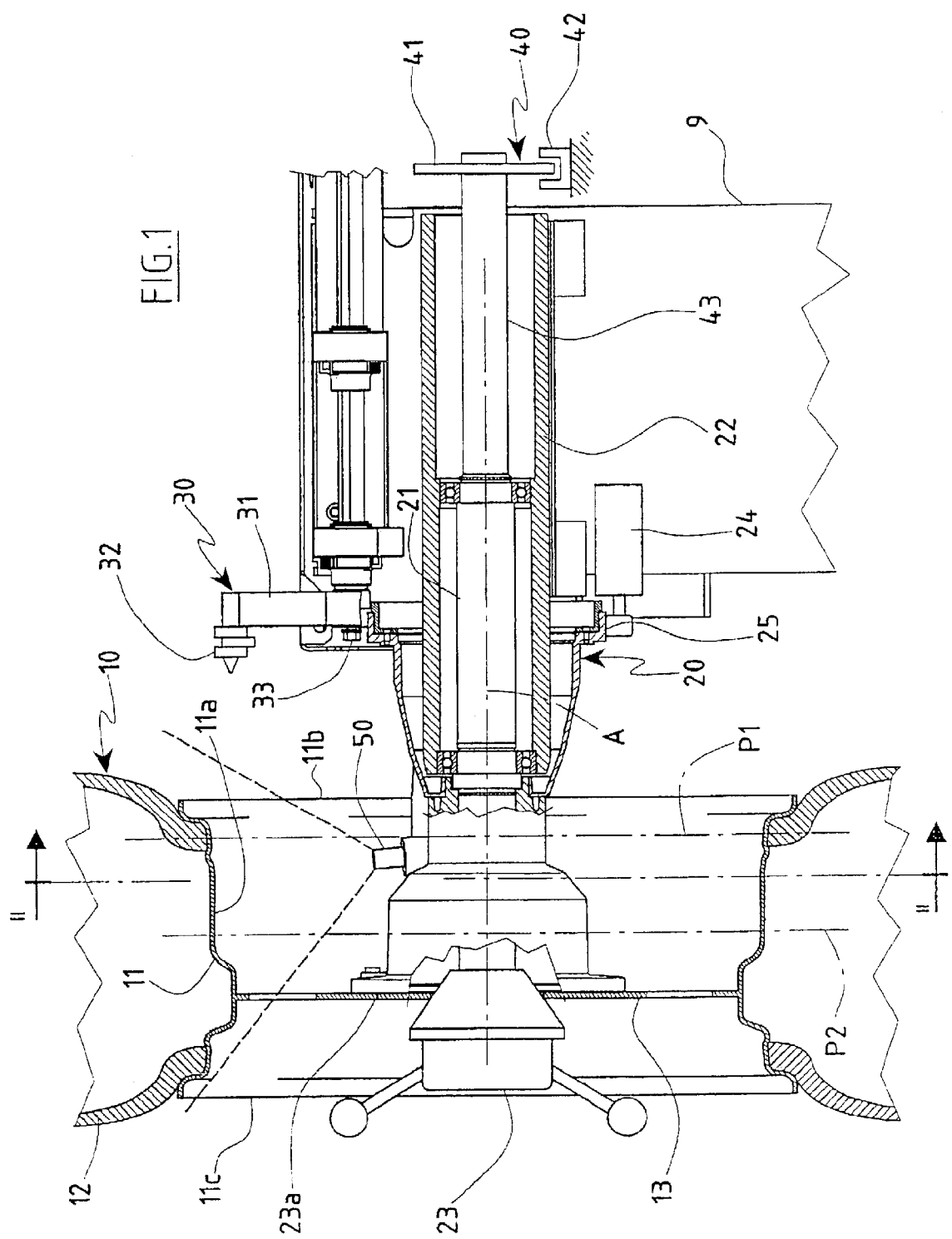
FIG. 1 is a section through the machine on the horizontal plane passing through the axis of the support and rotation means.
Figure 2:
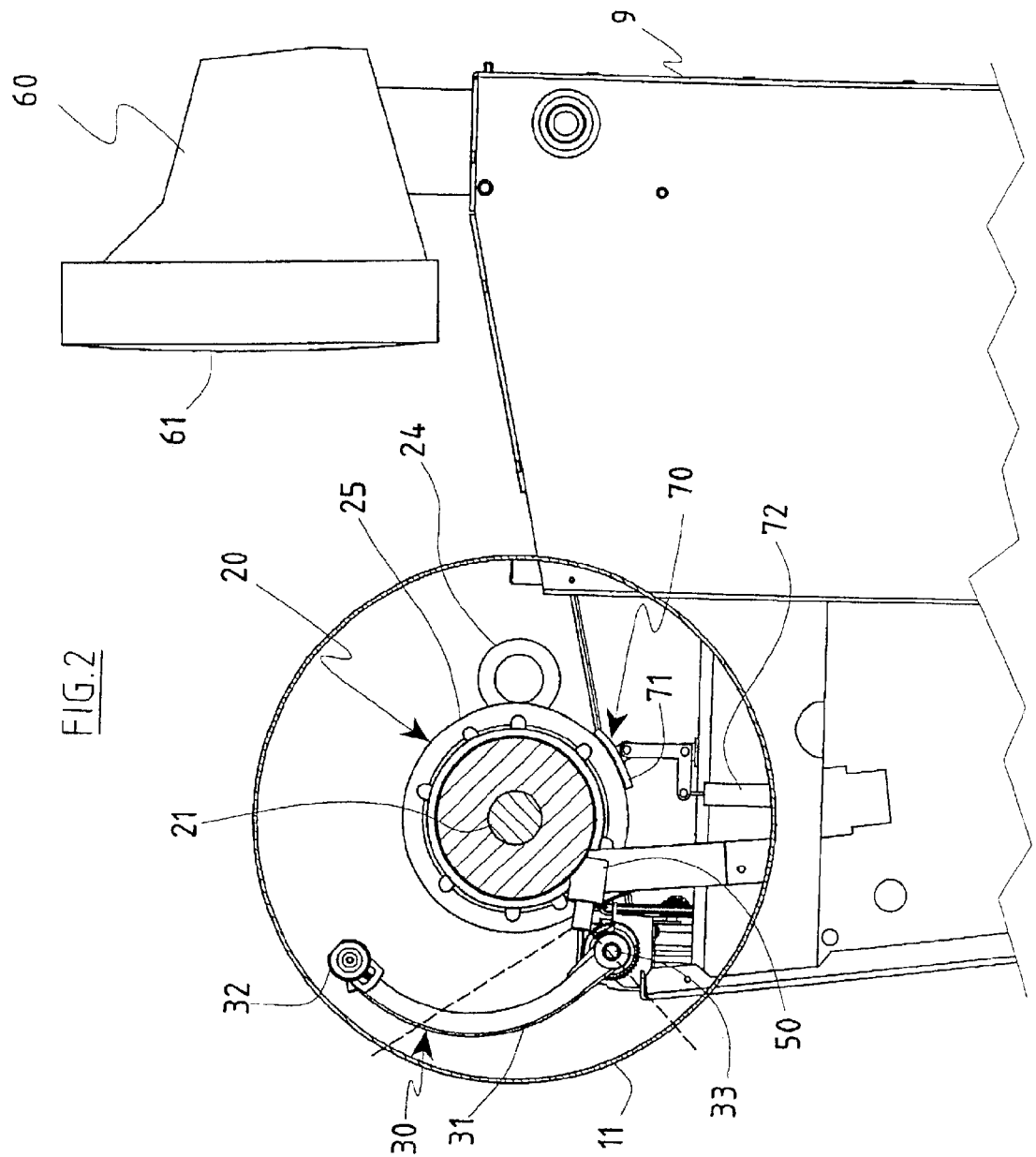
FIG. 2 is a section on the vertical plane II—II of FIG. 1.

In both FIGS. 1 and 2 certain parts are not sectioned whereas others are shown schematically for a better understanding of the figures.

Figure 3:
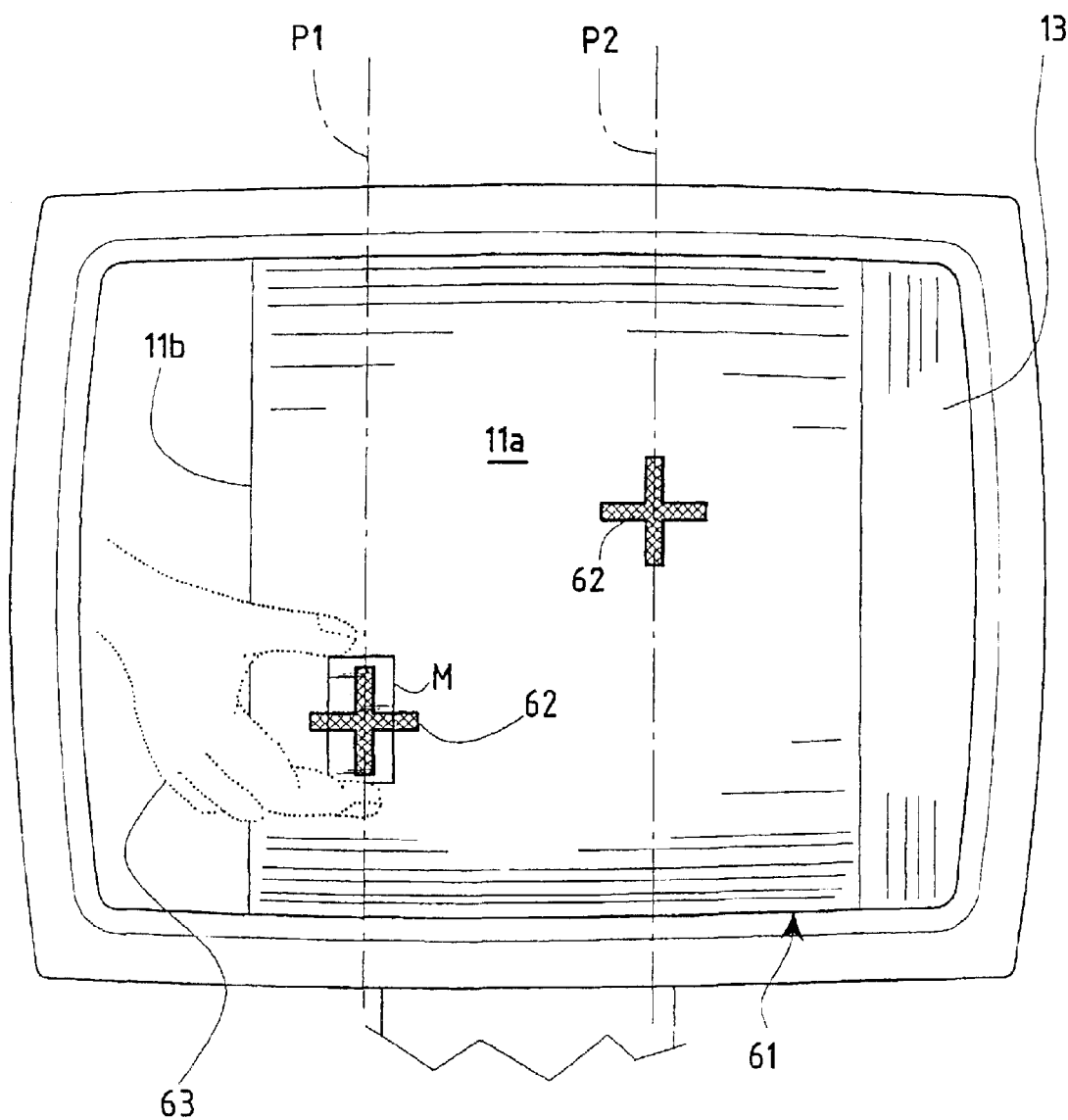

FIG. 3 shows an example of images visible on the display screen.

DETAILED DESCRIPTION OF THE DRAWINGS

The machine shown in the figures is for balancing motor vehicle wheels 10, in this case the surface on which the balancing masses are to be applied to the body being defined by the wheel rim inner surface 11a, which also comprises the two edges 11b and 11c of the wheel rim; a different application surface could however be chosen.

The wheel 10 also comprises a tyre 12 fitted onto the outer surface of the wheel rim 11 and a transverse plate ("web") 13 through the centre of which the axis of rotation of the wheel 10 passes.

As in the case of known balancing machines, the machine of the invention comprises a support and rotation means (indicated overall by 20) arranged to support and lock the wheel 10 and to rotate it about its axis of rotation. In the embodiment shown in the figures, said means 20 comprises a shaft 21, supported by a bush 22 supported by the fixed frame 9 of the machine, and carrying at one end suitable means 23 to lock the wheel 10 such that its axis coincides with the axis A of the shaft 21 and to rotate it together with said shaft. Said means 23 possess a transverse contact surface 23a against which the wheel web 13 is made to abut, this latter advantageously defining a transverse reference plane for the machine operations. Alternatively, a different transverse reference plane can be chosen.

The shaft 21 is motorized by a motor 24 which, in the particular embodiment shown in the figures, acts by transmitting the movement of its shaft to a circular rotation track 25 provided on a cap rigid with the shaft 21 and coaxial thereto.

To the shaft 21 there are also connected means (of well known type, not shown in the figures) for determining the imbalance factors on the wheel, by any suitable known technique for determining these factors.

The machine also comprises first sensor means, of known type (indicated overall by 30), for determining the axial position of at least one chosen transverse balancing plane in which to apply the balancing mass to the application surface 11a and the radial position of points on this surface 11a of the wheel rim 11 lying in this balancing plane.

In the embodiment shown in the figures, said first sensor means 30 comprise a movable arm 31 carrying at its free end a feeler element 32 arranged to make contact with the application surface 11a of the wheel rim, and connected to means (not shown in the figures) for determining the geometrical position of the feeler 32. The arm is movable by rotation about a pin 33 having its axis parallel to the axis A of the shaft 21 and by translation in the direction of this axis By virtue of said movements of the arm 31 the means 30 are able to determine the axial position of any transverse plane through the application surface 11a of the wheel rim and the radius (i.e. the radial distance from the axis A) of points on the surface 11a in correspondence with said transverse planes.

The machine also comprises second sensor means (indicated overall by 40) to determine the angular position of the wheel. In the embodiment shown in the figures, said means 40 are defined by an encoder having a rotating part 41 applied to the end of a shank 43 applied to the shaft 21, and a fixed sensor 42 acting on the rotating part 41.

Said sensor means 30 and 40 enable significant data to be acquired regarding the geometrical position of all points on the application surface 11a (including the wheel rim edges).

The machine also possesses a processor means (not shown in the figures), typically a computer for processing the data originating from the first sensor means 30, from the second sensor means 40 and from the imbalance sensing means, to determine the value of the balancing mass or masses and the position of their point of application to the surface 11a of the wheel rim.

According to the invention, the machine comprises in a fixed position a means 50, typically a digital video camera, for acquiring images originating from the application surface 11a of the wheel rim.

Preferably the video camera is disposed in a position such that the axis B of its lens is in the closest possible position to the middle transverse plane between the edges 11b and 11c of the wheel rim 11 and is orientated as radially as possible, in order to frame the application surface 11a in the most symmetrically and centrally manner possible. This is achieved taking account of the overall size of the video camera and of those moving members of the machine lying within the wheel rim. The visual field of the video camera must also be such as to frame the entire axial dimension of the application surface 11a of the wheel rim 11 (together with a sufficiently wide angle in the transverse plane. If this is not the case, the video camera must be made movable (for example by swivelling it in the axial plane) to be able to selectively frame every point of the axial dimension of the surface 11a.

In combination with the rotation of the wheel 10, the video camera 50 is able to acquire images from every portion of the surface 11a.

Preferably a light source (not shown in the figures) is provided able to emit a light beam into the region framed by the video camera 50.

As an alternative to the video camera for visible light, an infrared video camera can be used, with which a light source emitting radiation in the infrared range must be associated.

According to the invention, the machine also comprises a display means 60, in particular a monitor, connected to the processor means, to display said images on its screen 61, which is accessible to the operator; the processor means can also indicate on the screen 61 the position of the point of application of the balancing mass in relation to the image of the application surface 11b which appears on it.

Specifically, to indicate the position of application of the balancing mass M, the processor means creates an optical pointer 62 (see FIG. 3) which is displayed on the screen 61 at said application position, superposed on the image of the surface 11a acquired by the video camera and appearing on the screen.

In use, the initial operative stages of the machine are traditional in that the wheel 10 is firstly placed on the shaft 21 with its web 13 in contact with the contact surface 23a and rigidly secured to the shaft 21 by the means 23. The operator then establishes the position (even approximately) of one or more transverse balancing planes (typically two planes are chosen in the case of dynamic balancing), i.e. spaced-apart planes, in each of which a respective balancing mass M is to be disposed on the surface 11a; the operator usually chooses these planes on the basis of practical criteria, for example such that the balancing mass M is not visible when the wheel is mounted on the vehicle, or such as to use a region on the wheel rim which is particularly suitable to receive the balancing mass. Two chosen balancing planes are indicated by P1 and P2 in the figures.

Having chosen the balancing planes P1 and P1 the operator, using the first sensor means 30, determines the axial position thereof and the radius of points on the surface 11a which lie in said planes P1 and P2. During this stage the angular position of the wheel is irrelevant but is monitored by the sensor means 40.

On rotating the wheel 10 by means of the motor 24, the wheel imbalance factors are determined by known methods and means, and the data obtained, together with the data originating from the first sensor means 30 and from the second sensor means 40, are processed by the machine processor means to determine the value of each balancing mass M and the position of its point of application on the surface 11a, calculated in correspondence with the respective plane P1, P2. For practical reasons, the application position determined by the processor can also be slightly displaced from the two planes P1 or P2, for example such that the value of the mass corresponds exactly to a value lying within a discrete range of commercially available balancing mass values available to the operator, or to a multiple of it.

At this point, to apply the balancing masses M to the wheel rim, the method in which the machine is used differs from that of known machines. The images originating from the wheel rim surface 11a are made available on the screen 61 by the machine, which also creates on the screen, superposed on these images, a pointer 62, one for each balancing mass M provided, pointing to the image of the actual point on the surface 11a calculated for application of the mass M.

In greater detail, the images acquired by the video camera are fed to the processor means which carries out a series of mathematical calculations on them.

Specifically, the processor means carriers out the following calculation procedures:

image linearization to compensate the optical deformation due to the curvature of the lens. The linearization calculation requires the position of the video camera relative to the machine to be known precisely;

calculation of the coordinates on the screen 61 at which to display the pointer 62. The following data are required for calculating the coordinates:

a. The distance of the first balancing plane P1 along the axis of rotation A relative to a fixed reference point on the machine (for example the plane defined by the contact surface 23a).

b. The radius of the surface 11a at the first balancing plane P1 (in which the first balancing mass is applied).

c. The distance of the second balancing plane P2 along the axis of rotation A relative to the fixed reference point on the machine.

d. The radius of the surface 11a at the second balancing plane P2 (in which the second balancing mass is applied).

e. Angular position of the shaft 21 carrying the wheel.

The first four items of data are determined by the first sensor means 30 using the feeler 32, which is positioned manually at the points concerned. To calculate the X coordinate on the screen 61 relative to a balancing plane, the software of the processor means uses as input data the values a and c (distance of the planes P1 and P2 from the reference plane) and the values b and d.

To calculate the Y coordinate on the screen, the software uses as input data the value of the angular position.

Having defined the coordinates, the software displays the pointers 62 on the screen 61, superposed on the image provided by the video camera. Whether the image of the pointers 62 is displayed depends on the angular position of the wheel 10; if the wheel position is such that the point of application of one of the balancing masses M lies within the visual field of the video camera, the pointer image appears on the screen 61 superposed on the image of the point of application on the surface 11a, otherwise the pointer image does not appear. Consequently, the calculation software is able to update in real time the position of the pointer on the screen on the basis of the angular position of the wheel. Advantageously, the machine also comprises a means 70 for automatically halting the rotation of the support and rotation means 20, for example comprising a brake 71, operated by an actuator 72, and acting by friction on the circular track 25 (see FIG. 2).

The brake 71 is connected via the processor means to the second sensor means 40, and is arranged to halt the rotation of the wheel 10 in an angular position such that the point of application of the balancing mass M on the surface 11a falls within any region of the field visible on the screen 61.

Alternatively, the support and rotation means 20 can be halted in a random position and the wheel 10 then be slowly rotated, for example by hand, until it reaches a position such that the pointer 62 appears on the screen 61.

The operator then applies each balancing mass to the respective point of application with the aid of the images which appear on the screen 61; essentially, he carries the balancing mass M, either by hand (as shown in FIG. 3) or by a mechanical means, to the point of application determined by the machine by following the image of the balancing mass on the screen 61, then applies it to the surface 11a when this image is suitably centered by the pointer 62.

FIG. 3 shows by way of example the images acquired by the video camera 50, these being indicated by the alphanumerical reference corresponding to the items from which the images originate. The hand of the operator moving the balancing mass M is indicated by 63, the balancing planes being indicated by the lines P1 and P2 (which could also not appear on the screen).

The image displayed on the screen 61 can be enlarged to facilitate the application of the balancing mass M.

In addition to the already indicated advantages, it should be noted that by virtue of the invention it is not necessary to precisely control the wheel braking because the position indicator on the screen can be moved on the basis of the angular position in which the wheel has halted. This leads not only to high precision in applying the masses M, but also to a considerable structural simplification with consequent manufacturing economies.

The invention can also be used for applying spring weights to the wheel rim edges.

Numerous modifications of a practical-applicational nature can be made to the invention, but without leaving the scope of the inventive idea as claimed below.

What is claimed is:

1. A machine for balancing rotating bodies, in particular motor vehicle wheels, by applying balancing masses onto a rotating application surface (11a) pertaining to the body, comprising:

a support and rotation means (20) for supporting the body (10) and rotating it about its axis of rotation, first sensor means (30) for determining the axial position of at least one chosen transverse balancing plane (P1, P2) in which to apply the balancing mass, and the radial position of points on the application surface (11a) on the body (10) which lie in said balancing plane (P1, P2), second sensor means (40) for determining the angular position of the body (10), means for determining the imbalance factors on the body (10), a processor means arranged to process the data originating from the first and second sensor means and from the imbalance determination means and to determine the value of the balancing mass and the position of its point of application on the application surface (11a), a means (50) arranged to acquire images originating from the application surface (11a), and a display means (60) to display said images on a screen (61) accessible to the operator, the processor means being connected to said display means (60) and indicating on the screen (61) the position of the point of application of the balancing mass in relation to the image of the application surface (11a) by means of an optical sign (62) appearing visibly superposed on the image of the surface (11a) acquired by the means (50) arranged to acquire images and displayed on the screen (61) wherein the means to acquire images will also acquire an image of the balancing mass as it is moved to its point of application, and the display means will display the image of the mass on the image of the application surface and optical sign.

2. A balancing machine as claimed in claim 1, further comprising a means for halting the rotation of the support and rotation means, connected to the second sensor means and arranged to halt the body (10) in an angular position such that the point of application of the balancing mass on the body (10) falls within any region of the field visible on the screen.

3. A method for using a machine for balancing rotating bodies, in particular motor vehicle wheels, by applying balancing masses to a rotating application surface (11a) pertaining to the body (10), comprising the following steps:

rotating the body;

determining, by first measurement sensor means (30), the axial position of at least one chosen transverse balancing plane (P1, P2) in which to apply a respective balancing mass, and the radial position of points on the application surface (11a) corresponding with said balancing plane (P1, P2), while the machine monitors the angular position of the body (10);

determining, by suitable means the the imbalance factors on the body (10)

processing the imbalance factors by a processor means together with the data originating from the first and second sensor means, to determine a value of each balancing mass and a position of its point of application on the application surface (11a);

acquiring images originating from the application surface (11a) on the body (10) are acquired by an image acquisition means (50), and displaying the images on the screen (61) accessible to the operator; and displaying by the processor means, on the screen (61), an optical sign (62) to indicate the position of the point of application of the balancing mass in relation to the image of the application surface (11a), said optical sign (62) appearing visibly superposed on the image of the surface (11a) acquired by the means (50) arranged to acquire images and displayed on the screen (61);

wherein the operator carries the balancing mass (M) to the point of application determined by the machine by following the image of the balancing mass itself on the screen (61), then applying it to the surface (11a) when this image is suitably centered by the sign (62).

* * * * *